United States Patent
Faccin et al.

(10) Patent No.: US 7,542,481 B2
(45) Date of Patent: Jun. 2, 2009

(54) CONNECTION OPTIMIZATION FOR COMMUNICATIONS IN MULTIPLE ACCESS ENVIRONMENT

(75) Inventors: Stefano M. Faccin, Dallas, TX (US); Basavaraj Patil, Coppell, TX (US)

(73) Assignee: Nokia Corporation, Espoo (FI)

( * ) Notice: Subject to any disclaimer, the term of this patent is extended or adjusted under 35 U.S.C. 154(b) by 868 days.

(21) Appl. No.: 10/720,105

(22) Filed: Nov. 25, 2003

(65) Prior Publication Data
US 2004/0165594 A1 Aug. 26, 2004

Related U.S. Application Data

(60) Provisional application No. 60/449,432, filed on Feb. 25, 2003.

(51) Int. Cl.
*H04L 12/56* (2006.01)
(52) U.S. Cl. .................. 370/469; 370/230; 370/310; 370/395.21
(58) Field of Classification Search ............. 370/466, 370/467, 469, 395.2, 395.21, 230, 230.1, 370/235, 236, 428, 352, 353, 354, 356; 379/201.01, 379/338, 352, 466, 469, 280; 709/238, 244, 709/241, 230, 250, 239, 223
See application file for complete search history.

(56) References Cited

U.S. PATENT DOCUMENTS

| | | | |
|---|---|---|---|
| 7,016,668 B2 * | 3/2006 | Vaidyanathan et al. | 455/418 |
| 7,269,647 B2 * | 9/2007 | Chang et al. | 709/224 |
| 7,286,520 B2 * | 10/2007 | Takeda et al. | 370/349 |
| 2002/0015395 A1 | 2/2002 | Karagiannis | |
| 2002/0191593 A1 * | 12/2002 | O'Neill et al. | 370/352 |

FOREIGN PATENT DOCUMENTS

| | | |
|---|---|---|
| EP | 1 206 145 A1 | 5/2002 |
| EP | 1 248 440 A2 | 10/2002 |
| WO | WO 01/91419 A1 | 11/2001 |

OTHER PUBLICATIONS

Huang, et. al, A novel SIP-Based Route Optimization for Network Mobility, IEEE Journal on Selected Areas in Communiations, vol. 24, No. 9, Sep. 2006.*

(Continued)

*Primary Examiner*—Henry Baron
(74) *Attorney, Agent, or Firm*—Squire, Sanders & Dempsey, LLP

(57) ABSTRACT

A mechanism for optimizing an establishment of a communication connection between a mobile node and a correspondent node in a packet based communication network using, for example, IP is proposed. After starting an application level communication connection setup, for example SIP based, between the mobile node and the correspondent node via a communication subsystem infrastructure, for example the IM subsystem infrastructure, a trigger signal comprising the address of the correspondent node is transmitted from the SIP layer to the IP layer in the mobile node via an interface. In response to the trigger signal, an IP level route optimization procedure is performed while the application level communication connection setup proceeds.

42 Claims, 14 Drawing Sheets

OTHER PUBLICATIONS

Wong, K., et al., A Multilayered Mobility Management Scheme for Auto-Configured Wireless IP Networks, IEEE Wireless Communications, Oct. 2003.*

Lopez, G., et al. A MIP-SIP Macro Mobility Management Scheme for VoIP Across Wired and Wireless Domains, IEEE 2004.*

Chen, Y., et al. SIP-based MIP6-MANET: Design and implementation of mobile IPv6 and SIP-based mobile ad hoc networks.*

Kellerer et al. Method of implementing network layer routing protocol for supporting mobile peer-to-peer layer protocol, involves transforming service-related data corresponding to service request to query message; 2003WO-EP11472 (Oct. 16, 2003).*

Johnson, David, et al., "*Mobility Support in IPv6*"<draft-ietf-mobil-leip-ipv6-19.txt>, Oct. 29, 2002, pp. 1-152.

3GPP TS 24.228 V5.2.0, *3RD Generation Partnership Project; Technical Specification Group core Network; Signalling Flows for the IP Multimedia Call Control Based on SIP and SDP; Stage 3 (Release 5)*, Sep. 2002, pp. 1-801.

* cited by examiner

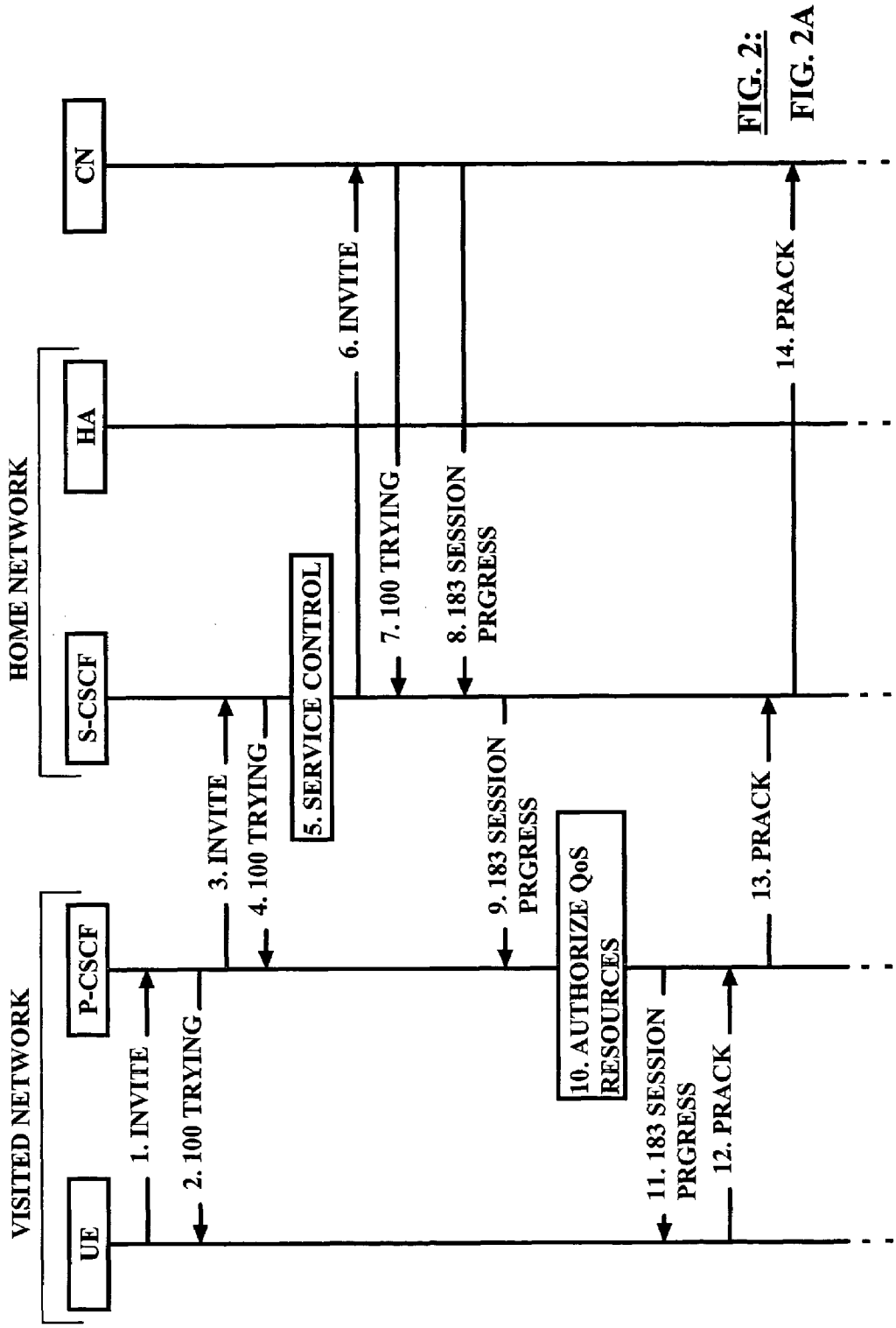

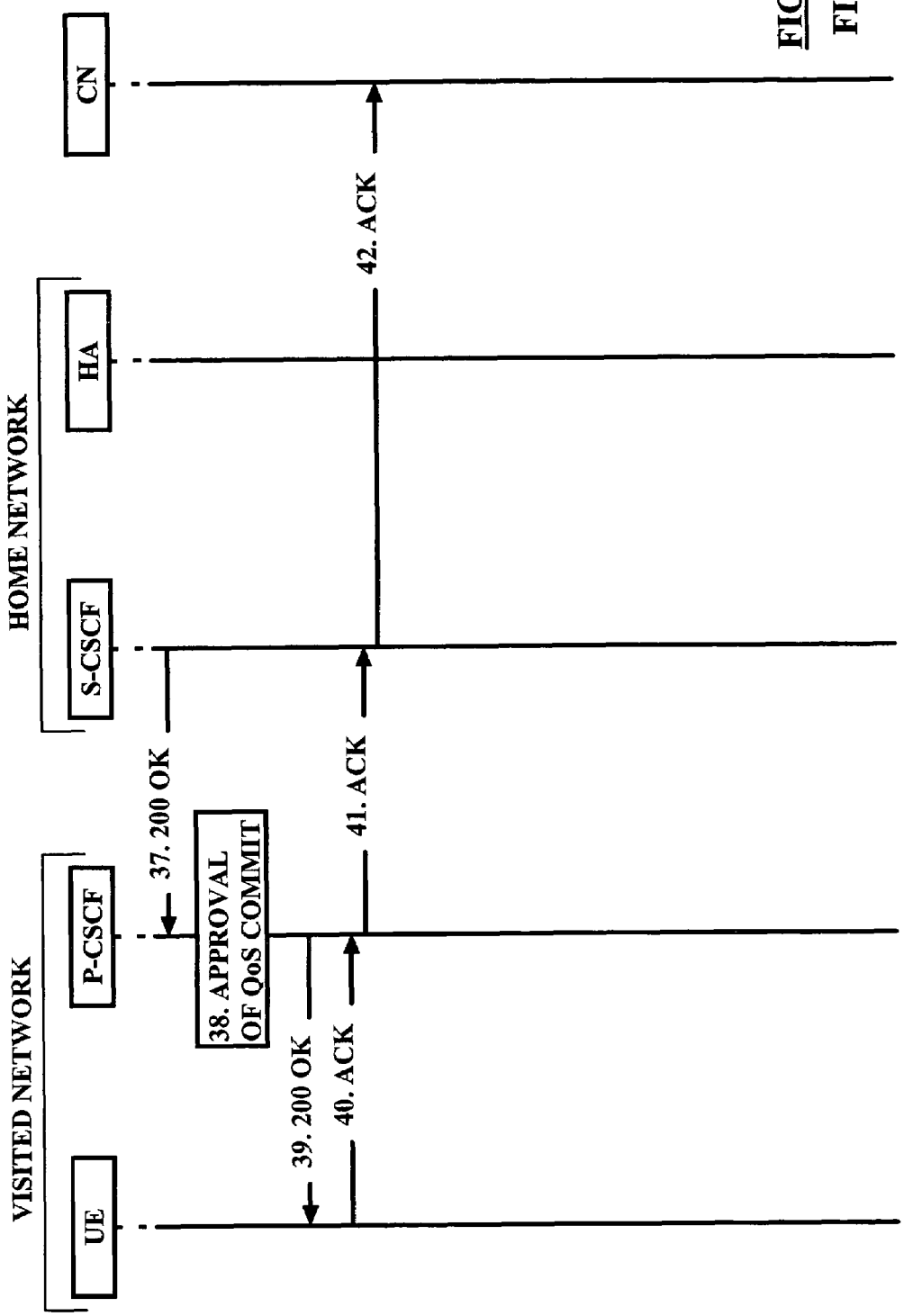

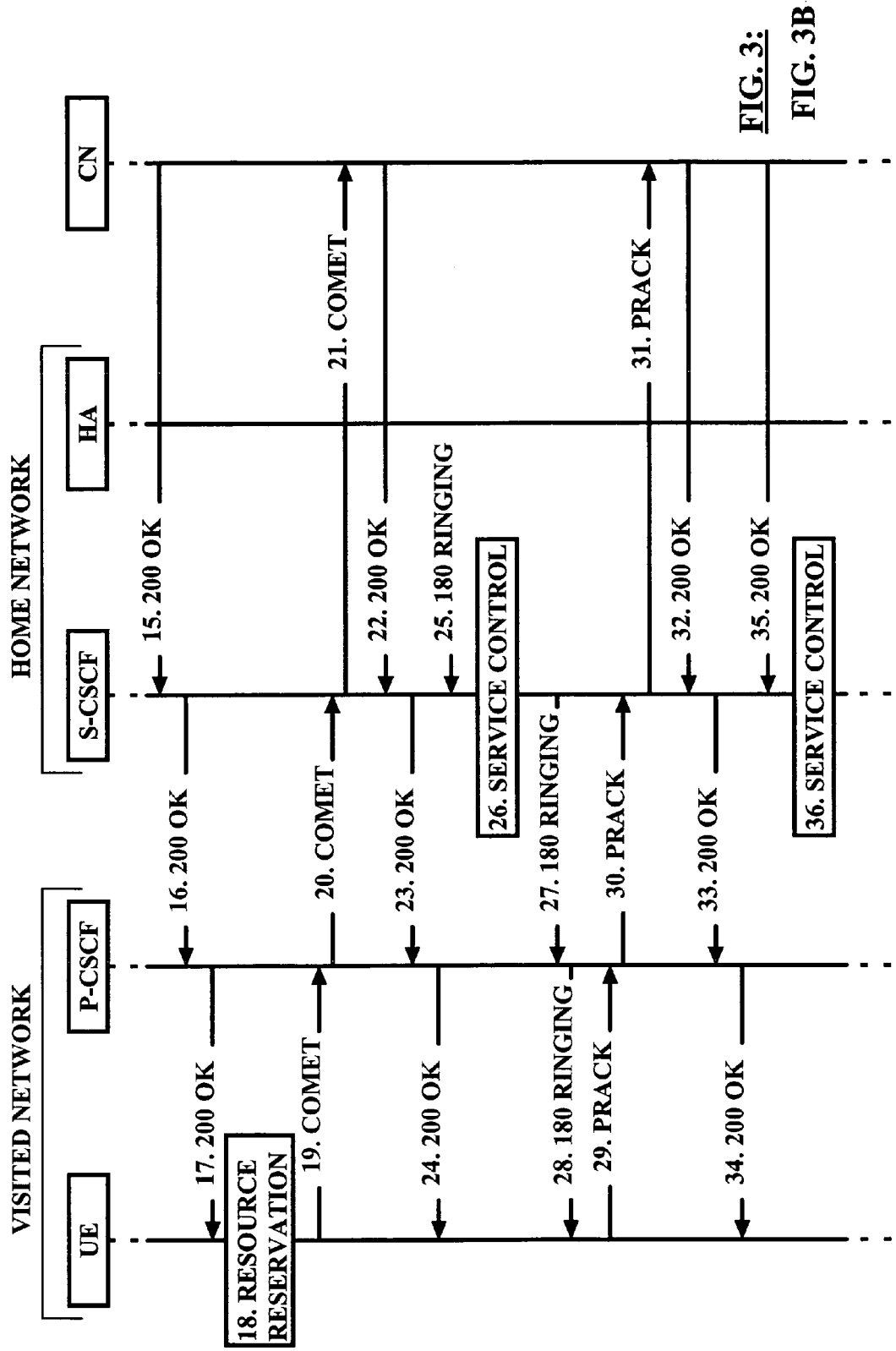

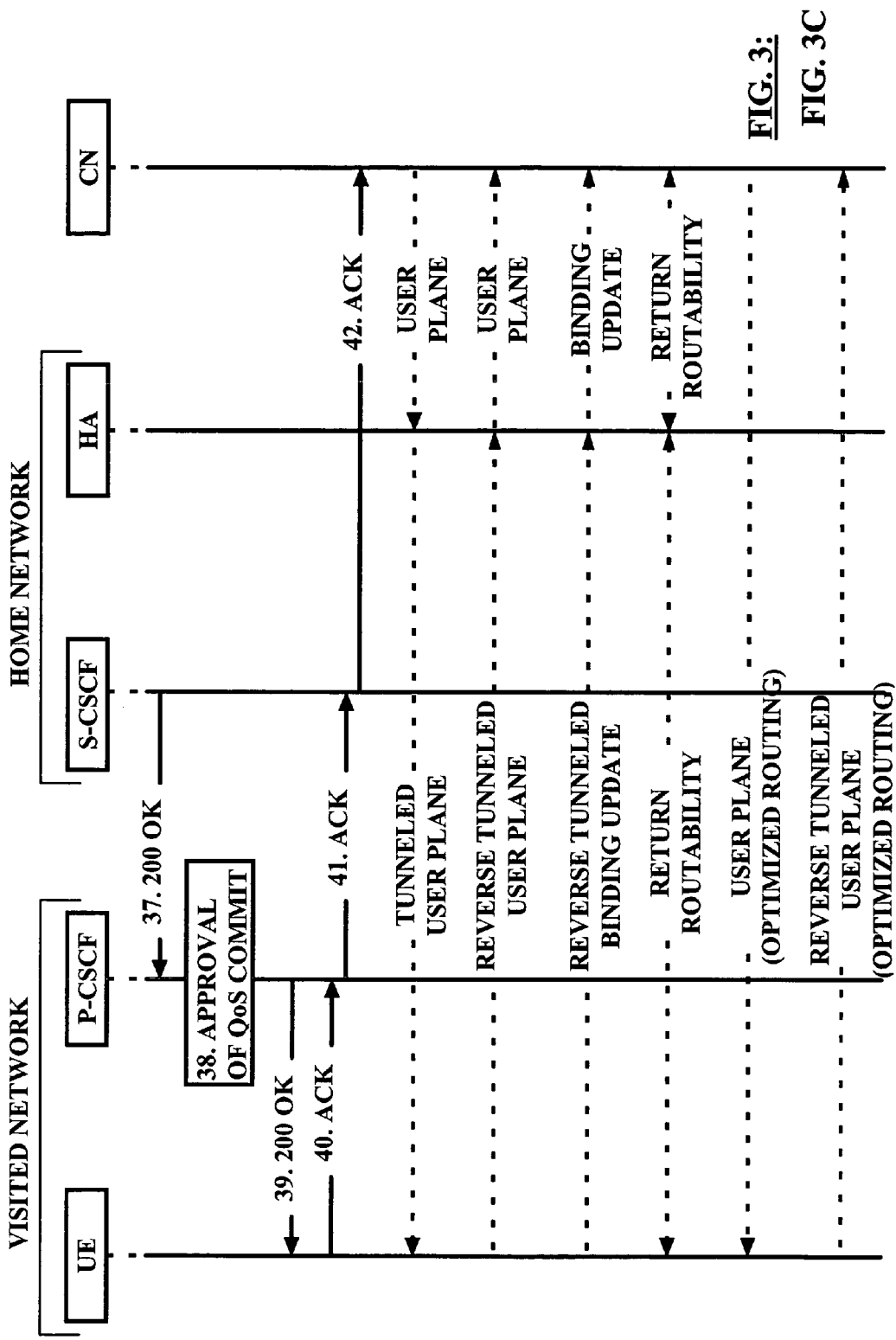

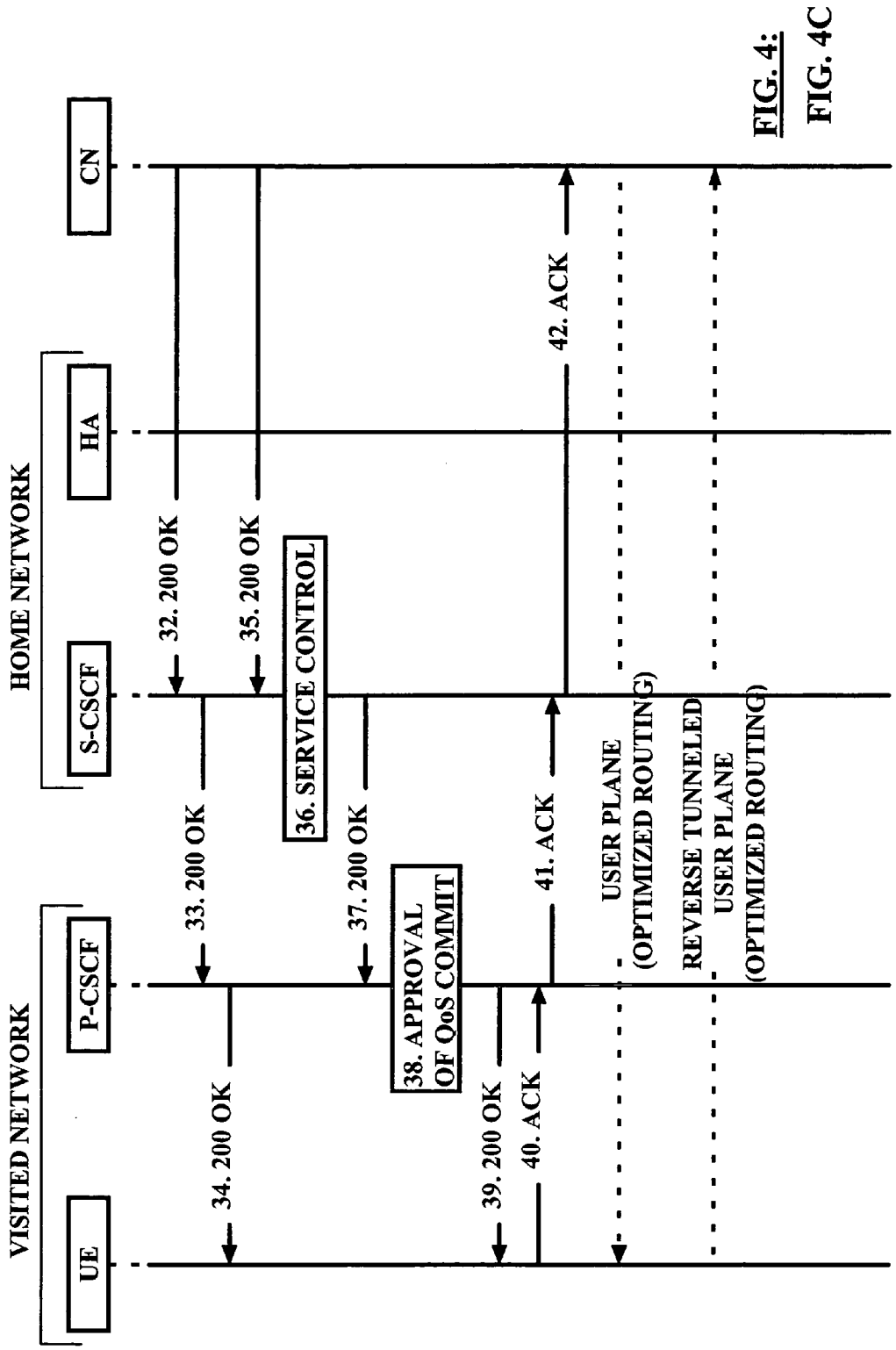

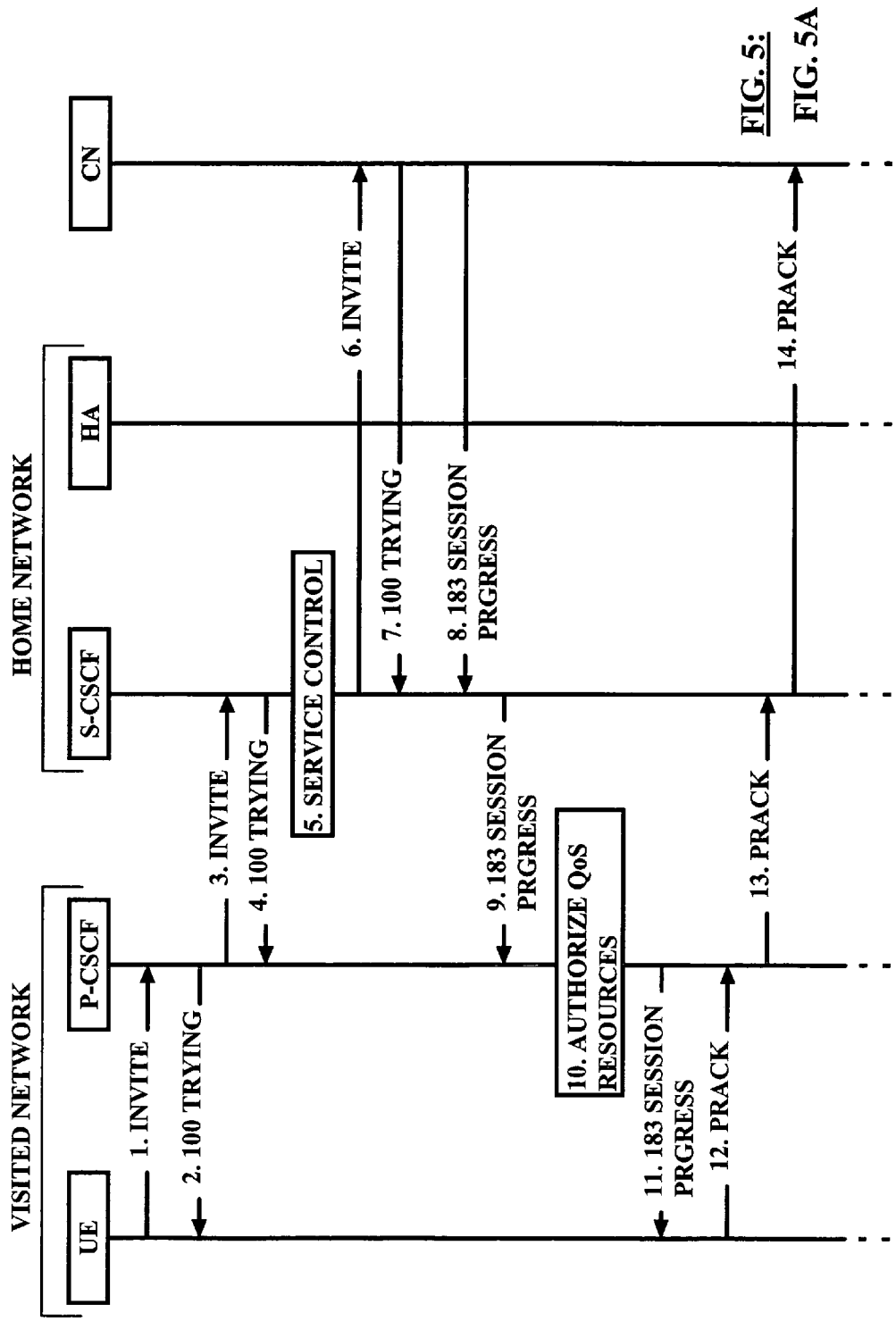

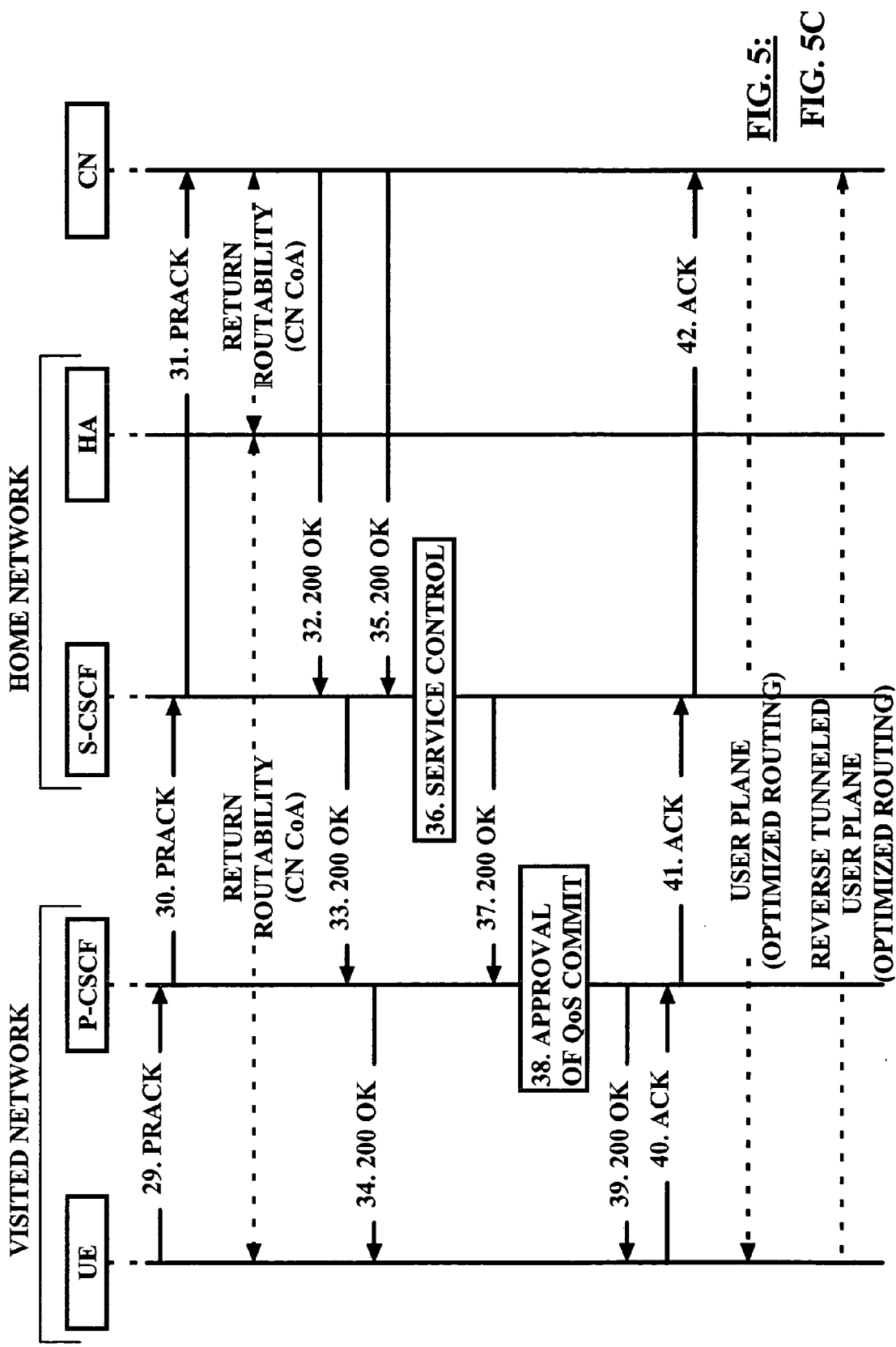

CONNECTION OPTIMIZATION FOR COMMUNICATIONS IN MULTIPLE ACCESS ENVIRONMENT

The present application claims the benefit of priority of provisional application Ser. No. 60/449,432, filed Feb. 25, 2003, the contents of which are incorporated herein by reference.

BACKGROUND OF THE INVENTION

The present invention relates to a method and/or a system and/or a network node for optimizing an establishment of a communication connection between a mobile node and a correspondent node in a packet based communication network. The present invention relates in particular to a method and/or a system and/or a network node in a $3^{rd}$ generation wireless communication network where the Session Initiation Protocol (SIP) is used as a multimedia call control protocol and the Internet Protocol (IP) is used as a data transport protocol (for example Mobile IPv6 is used as the IP Mobility protocol).

The last few years have seen communication networks, in particular wireless networks, increasingly extending deployments and coverage all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), Institute for Electrical and Electronic Engineers (IEEE), and the like are working on standards for $3^{rd}$ generation telecommunication network and multiple access environments, such as GPRS/UMTS (General Packet Radio Service/Universal Mobile Telecommunications System), Wireless Local Area Network (WLAN), cdma2000 (code division multiple access) and the like. The aim of $3^{rd}$ generation telecommunication systems is to provide improved services for users in comparison to present $2^{nd}$ generation systems, such as GSM, in particular with regard to data transmissions, for example, in multimedia applications.

With the convergence of voice and data networks, new communication networks, for example, $3^{rd}$ generation wireless networks, are evolving to adopt packet switched networks to deliver voice and data services over this type of network. In order to support voice and multimedia by a packet data network based, for example, on the Internet Protocol (IP), the Internet Protocol Multimedia (IM) core network subsystem (referred to hereinafter as IM subsystem) is provided. The IM subsystem can control voice and multimedia calls and sessions as well as interconnections to other networks, such as other UMTS networks, Public Switched Telecommunication Networks (PSTN) and the like. In the IM subsystem, IP and other protocols standardized by the IETF are used. IPv6 is the mandated network layer protocol for the IM subsystem, for example, in 3GPP.

For performing registration and call control for the user equipment in the IM domain or subsystem, for example, the Session Initiation protocol (SIP) is used as a signaling protocol. SIP is an application layer protocol for establishing, changing and tearing down of sessions between two or more participants. Multimedia session setup also requires QoS (Quality of Service) to be setup for the media path. The control of the call relates to inviting and synchronizing the various participants in the call, i.e. the respective terminal nodes (user equipment and correspondent node) and involved network elements. Furthermore, information about the characteristics of the terminating equipment and the speech codecs to be used between the users (i.e. user equipment and correspondent node) can be announced by the participants. This information is known as the session description, and could include, for example, the codecs used for the speech and the bandwidth needed for the speech paths. SIP essentially provides the invitation and synchronization of the participants, and it uses session description protocol (SDP) to describe the session. SIP and SDP are standardized by the IETF.

As call control functional entity in the IM domain a so-called call state (or session) control function (CSCF) is used. CSCFs are classified into several types, such as Proxy-CSCF (P-CSCF), Serving CSCF (S-SCSF) and Interrogating CSCF (I-CSCF). The S-CSCF controlling a call of the user equipment is located, for example, in the network to which the user is subscribed, i.e. the home network of the user. The P-CSCF is an entry point for the connection of the user equipment to the network and is located in the network in which the user equipment is currently located. When the user equipment has roamed to another network than its home network the P-CSCF is part of the visited network. The P-CSCF can also be a part of the home network when it interfaces to a gateway network element, such as a GGSN (Gateway GPRS Support Node). The I-CSCF is used to determine the S-CSCF to be assigned to a user equipment (UE) for registration or when a mobile terminating call is received in the IM subsystem. A Home Subscriber Subsystem (or Server) (HSS) is also provided in the user's home network which provides user profile information.

SIP messages are usually transported by the Transmission Control Protocol (TCP) or User Datagram Protocol (UDP). However, SIP is transport independent and other protocols, such as the Stream (or Simple) Control Transmission Protocol (SCTP), can be used to provide a higher level of quality than TCP.

The UE needs to establish, for example, a packet data protocol (PDP) context in order to be able to send and receive IP datagrams. Only after a PDP context has been established the UE is able to exchange messages to and via the IMS. The connection between the user equipment and the IM subsystem is established via a Radio Access Network (RAN), for example UTRAN (UMTS Terrestrial RAN), and the mobile packet core which may comprise of a SGSN (Serving GPRS Support Node) and the GGSN (Gateway GPRS Support Node), which essentially form the packet data core of the UMTS network (in the case of a cdma2000 network it is the PDSN (Packet Data Serving Node)).

The mobile node (or UE) may use, for example, Mobile IPv6 for achieving IP mobility. With Mobile IPv6, the mobile node has a home address (HoA) and a care-of-address (CoA). The home address is the IP address assigned by the home network and is the address used to reach a mobile node. The care-of-address is an IP address that is derived from the current point of attachment. The mobile node indicates its care-of-address to a server, e.g. its home agent (HA), via a binding update procedure, and IP routing/tunnelling ensures that packets are routed to the mobile node at its current care-of-address (location) even when packets are sent to its home address. A mobile changes its care-of-address when the access router that it is attached to changes. Hence if the mobile were to move, for example, to a different PDSN, it would obtain a new care-of-address.

When a communication connection between a user equipment UE (or mobile node MN) and a correspondent node (CN) has been established, for example, via SIP signaling, and in case MIPv6 is used to support IP level mobility, a procedure known as route optimization can be executed by the terminal nodes. By route optimization data can be directly transmitted between the MN and the CN without having to traverse through the HA. Route optimization is initiated, for example, by the MIPv6 MN by sending a Binding Update to the CN to provide the MN's CoA corresponding to the MN's Home Address (MN HoA). For this purpose, the MN needs to know the CN's IP address so as to be able to send the binding update to the CN. The IP address of the CN is known or provided, for example, when the CN first sends a packet to the MN's HoA which results in the packet being tunneled by the MN's HA to the MN. Now, the MIP module of the MN knows the destination IP address of the CN and reacts by sending a Binding Update also to the CN. In order to ensure the security of the Binding Update, i.e. to ensure for the CN that the CoA provided by the MN is actually owned by the MN, a Return Routability test is mandated by MIPv6 specification (for example in Internet Draft "Mobility Support in IPv6" (draf-t.ietf-mobileip-ipv6-19.txt)). Such a Return Routability test requires the exchange between the MN and the CN of a series of messages that are defined in the Mobile IPv6 specification.

Referring to FIG. 2 consisting of FIGS. 2A, 2B, and 2C, an example for a SIP call establishment according to 3GPP is described first. It is to be noted that the described scenario is only one from a plurality of examples. Further information with regard to SIP call establishment scenarios are derivable, for example, from 3GPP 24.228 V5.2.0 (2002-09) "Signalling flows for the IP multimedia call control based on SIP and SDP", Stage 3, Release 5.

When a call between the UE and the CN is to be established, the UE determines a set of codecs that it is capable of supporting for the session and which are desired for the session, and builds up SDP comprising, for example, bandwidth requirements, connection characteristics and the like. The address of the called CN, for example the CN's telephone number or another useable address, is comprised in the SDP descriptor. Then, with message 1, the UE sends an INVITE request which comprises the initial SDP, information on the called CN (routing information), a description of the call, the address of the endpoint of the connection on the originating UE side and the like, to the P-CSCF which has been determined, for example, via a CSCF discovery mechanism. The INVITE message is based on the CN's SIP URI (Uniform Resource Identifier). The initial SDP may represent one or more media for a multimedia session. Upon receiving the INVITE message, the P-CSCF stores information about the session, for example the address of the originating UE, and responds with a 100 Trying provisional response (message 2) to the UE. Additionally, the P-CSCF adds headers based on routing information to the message and forwards the INVITE message to the S-CSCF in the UE's home network (message 3). Upon receiving the INVITE message, the S-CSCF stores information about the requested session and responds to the P-CSCF with a 100 Trying provisional response (message 4). Then, in step 5, the S-CSCF performs a service control logic being appropriate for this session attempt. The S-CSCF examines, for example, the media parameters included in the INVITE message and adapts or restricts this to authorization settings for the user. Then, in message 6, the INVITE message is forwarded to the CN. Upon receiving the INVITE message, the CN responds with a 100 Trying message (7) to the S-CSCF. The requests in the INVITE message are processed by the CN, and an 183 Session Progress provisional response indicating the media stream capabilities of the destination node are returned along the signaling path via the S-CSCF (8) to the P-CSCF (9). In the P-CSCF, in step 10, the resources necessary for this session are authorized. Then, the P-CSCF forwards the 183 Session Progress response to the originating endpoint, i.e. to the UE (message 11). Upon receipt of the 183 Session Progress response from the P-CSCF, the UE determines which media flows should finally be used for this session and which codecs should be used for each of those media flows. If there was any change in media flows or if there was more than one choice of codec for a media flow, the UE includes a new SDP offer in a PRACK request message to be sent to the CN. The PRACK, which represents a reliable provisional message for extension requests acknowledgment, is sent to the P-CSCF (message 12), which adds a route header corresponding to the session and transmits the PRACK message to the S-CSCF (message 13). The S-CSCF forwards the PRACK request to the terminating endpoint CN (message 14).

The CN responds to the PRACK request with a 200 OK response to the S-CSCF in order to indicate that it accepts (message 15). The 200 OK response is forwarded by the S-CSCF to the P-CSCF (message 16), which in turn forwards it to the UE (message 17). In step 18, QoS (Quality of Service) setup is performed and the UE determines the final media streams and initiates a reservation procedure for the resources needed for this session. When the UE has completed the resource reservation procedure, it sends a COMET request (message 19), which represents a reliable indication if the preconditions for this session have been met, to the P-CSCF in order to indicate the successful resource reservation. Alternatively, an UPDATE message can be used. The P-CSCF forwards the COMET message to the S-CSCF (message 20), which transmits it to the CN (message 21). The CN responds to the COMET request with a 200 OK response in which a SDP is included for indicating that the resource reservation was successful both in the local and the remote segment. This 200 OK message is transmitted via the S-CSCF (message 22) and the P-CSCF (message 23) to the UE (message 24). Optionally, the called CN may perform alerting. This is signaled to the calling party by means of a 180 Ringing provisional response (message 25). Upon receipt of the 180 Ringing response, the S-CSCF performs in step 26 a service control logic being appropriate for this session attempt. The 180 Ringing response is forwarded to the P-CSCF (message 27). From the P-CSCF, the 180 Ringing response is forwarded to the UE (message 28). The UE indicates to the originating subscriber that the destination is ringing. It responds to the 180 Ringing provisional response with a PRACK request (message 29) to the P-CSCF. The PRACK request is forwarded from the P-CSCF to the S-CSCF (message 30), which then forwards it to the CN (message 31). The CN responds to the PRACK request with a 200 OK response to the S-CSCF in order to indicate that it accepts (message 32). The 200 OK response is forwarded by the S-CSCF to the P-CSCF (message 33), which in turn forwards it to the UE (message 34). The terminating endpoint, i.e. the CN, sends a final response to the INVITE message (message 6) by means of a 200 OK response over the signaling path. This is typically generated when the subscriber has accepted the incoming session attempt. The response is sent to the S-CSCF (message 35). Upon receipt of the 200 OK response, in step 36, the S-CSCF performs service control logic being appropriate for this session completion.

Then the 200 OK response is forwarded to the P-CSCF (message 37). Upon receipt thereof, in step 38, the P-CSCF approves the commitment of the QoS resources for the session. Then, the P-CSCF forwards the 200 OK response to the UE (message 39). The UE can now start the media flow(s) for this session. The UE responds to the 200 OK response with an ACK request sent to the P-CSCF (message 40). The ACK request is forwarded from the P-CSCF to the S-CSCF (message 41), which forwards it to the CN (message 42). Now, the session path is established, i.e. both the UE and the CN knows the respective destination and can send data packets to each other.

Referring to FIG. 3 consisting of FIGS. 3A, 3B, and 3C, a present scenario is described in which a SIP call establishment according to 3GPP and/or 3Gpp2 (cdma2000) is added by a MIPv6 user plane routing optimization. In an environment where SIP is used for multimedia communications setup between an UE and a CN, the MN is setting up the call through the IM subsystem which provides the SIP infrastructure. The IP address of the CN is provided to the MN in the SDP descriptor in the SIP signalling messages. The SIP call establishment has been described above in connection with FIG. 2. The destination address used by the MN (UE) to send the SIP signalling messages is that of the P-CSCF while the IM subsystem routes the SIP signalling messages to the CN. At the IP layer of the protocol stack, the MN recognizes that the end-point of the communication is the CN when the actual media flow begins. In other words, when the CN sends the first user plane packets of the multimedia communication, the IP address of the CN is available to the MIP layer in the MN. The user plane or media plane which is used for routing data packets between the UE and the CN is first established via the home agent (HA) of the MN as the MN's HoA is used as the source address of the SDP of the SIP messages and hence only the MN's CoA is known to the CN. The HA tunnels the user plane packets to the CoA of the MN which is mapped to the MN's HoA in the HA. In the reverse direction, the user plane from the UE to the CN may be also tunneled via the HA. At this point, i.e. after the call has been setup and the media flow has started from the CN, the MN can send a Mobile IPv6 Binding Update message via the HA to the CN since the CN's IP address is derived from the transmitted media flow (user plane). The Binding Update message is sent to the CN after completion of the return routability test. This test requires the exchange of a series of messages defined, for example, in the MIPv6 specification between the MN and the CN. When the Return Routability procedure is successfully finalized, the CN starts to use the CoA as the destination address of the MN. Thus, an optimized routing between the MN and the CN can be established so that the MN (UE) and the CN are directly linked, i.e. user plane traffic can be routed directly to the CoA of the UE and/or of the CN. This avoids the use of long routing paths in the networks.

However, present route optimization techniques in environments implementing network layer sessions (e.g. IP based) and application layer sessions (e.g. SIP based) may provide some drawbacks.

With the current route optimization technique specified, for example, by Mobile IPv6 and the use of SIP to setup a media session, there do exist QoS issues. Since the QoS setup for a multimedia session occurs based on the addresses used by the MN and the CN, the path for QoS setup initially changes once route optimization has been initiated. IP Packets that form the media stream from the CN to the MN have to traverse through the HA all the time and this adds latency.

The resource reservations or QoS parameters for the bearer packets may be done for a path that goes via the MN's Home Agent as a result of the MN providing the Home Address to the IM subsystem and the CN as the IP address in the SDP descriptor. When the MIPv6 Route Optimization procedure is completed, the path changes and QoS may need to be setup again for the changed path. This has implications on added signalling to accomplish this.

Furthermore, the latency of initial packets from the CN to the MN and vice-versa is greater than the latency of packets that are sent after the Route Optimization is completed. Hence there is a change in the characteristics of the flow that can impact the applications and user perceptions.

SUMMARY OF THE INVENTION

Thus, it is desirable to provide an improved method and/or system and/or network node which are usable for optimizing a communication connection between a mobile node and a correspondent node in a packet based communication network.

Furthermore, it is desirable to provide an improved method and/or system and/or network node in a multiple access environment for optimizing a communication connection between a mobile node and a correspondent node wherein an application level (e.g., multimedia) call establishment and a network level (e.g., an IP level) communication connection optimization in the presence of network level (e.g., IP) mobility are performed such that an network level QoS setting is improved and delays in the user plane packets flow can be avoided.

According to one aspect of the proposed solution, there is provided, for example, a method of optimizing an establishment of a communication connection between a mobile node and a correspondent node in a packet based communication network, the packet based communication network comprising a plurality of call session control function elements and a server of the mobile node constituting a communication subsystem infrastructure, the method comprising the steps of starting an application level communication connection setup procedure between the mobile node and the correspondent node via the communication subsystem infrastructure by transmitting and receiving application level signaling messages between the correspondent node and the mobile node, transmitting, during the application level communication connection setup procedure, a trigger signal from an application layer to a network layer in the mobile node wherein the trigger signal comprises the address of the correspondent node, performing, in response to the trigger signal, a network level route optimization procedure during the application level communication connection setup procedure.

According to another aspect of the proposed solution, there is provided, for example, a system for optimizing an establishment of a communication connection between a mobile node and a correspondent node in a packet based communication network, the packet based communication network comprising a plurality of call session control function elements and a server of the mobile node constituting a communication subsystem infrastructure, the system comprising means for performing an application level communication connection setup procedure between the mobile node and the correspondent node via the communication subsystem infrastructure by transmitting and receiving application level signaling messages between the correspondent node and the mobile node, means for producing and transmitting, during the application level communication connection setup procedure, a trigger signal from an application layer to a network layer in the mobile node wherein the trigger signal comprises the address of the correspondent node, means for performing, in response to the trigger signal, an network level route optimization procedure during the application level communication connection setup procedure.

Furthermore, according to one aspect of the proposed solution, there is provided, for example, a network node usable in a packet based communication network, the packet based communication network comprising a plurality of call session control function elements and a server of the network node constituting a communication subsystem infrastructure, wherein an establishment of a communication connection between the network node and a correspondent node in the packet based communication network is optimized, the network node comprising means for performing an application level communication connection setup procedure between the network node and the correspondent node via the communication subsystem infrastructure by transmitting and receiving application level signaling messages between the correspondent node and the network node, means for producing and transmitting, during the application level communication connection setup procedure, a trigger signal from an application layer to a network layer in the network node wherein the trigger signal comprises the address of the correspondent node, means for performing, in response to the trigger signal, a network level route optimization procedure during the application level communication connection setup procedure.

According to further refinements, the proposed solutions may comprise one or more of the following aspects:
- the packet based communication network may comprise wireless communication network parts;
- the network level may be based on an IP based transport protocol;
- the address of the correspondent node may be an IP address;
- the IP based transport protocol may use Mobile IPv6;
- the server may be a home agent (HA);
- the application level communication connection setup procedure may be executed by using the session initiation protocol (SIP) wherein the address of the correspondent node is provided to the mobile node in a session description protocol descriptor;
- the network level route optimization procedure may comprise a binding update procedure in which the care-of-address of the mobile node is transmitted to the correspondent node;
- the network level route optimization procedure may comprise an initialization of a network level route optimization on the mobile node side;
- the network level route optimization procedure may comprise an initialization of a network level route optimization on the correspondent node side when an network level route optimization signaling from the mobile node is received;
- the network level route optimization procedure may be completed before the application level communication connection setup procedure is completed;
- the trigger signal may be transmitted via an interface provided between the application layer and a network level module in the network layer of the mobile node;
- the interface may be implemented by an application programming interface (API);
- the network level module may transmit an acknowledgment to the application layer after the trigger signal comprising the address of the correspondent node is received.

By virtue of the proposed solution, the following advantages can be achieved:
- By providing a communication or signalling mechanism between the application layer and the transport or network layer, for example, between the SIP layer and the MIPv6 layer, in the protocol stack of a UE, the network (e.g. MIPv6) layer can be informed about the address of the CN before the CN transmits packets via the user plane. This means that, for example, SDP information is usable to initialize IP route optimization signalling related to IP mobility. Hence, e.g. MIPv6 route optimization can be effected while the establishment of the SIP communication with a corresponding node proceeds, i.e. during the signalling phase of the SIP based call setup to the corresponding node. This means that the first packets transmitted by the CN can already be sent via an optimized route. This reduces the latency of packets, and the signalling as a whole is improved.
- When the route optimization procedure (related to IP mobility, for example) is completed before the completion of the SIP call establishment, the path between UE and CN does not change after the SIP call setup. Hence, QoS setup does not need to be repeated, and the signalling performance is improved.
- The proposed solution is easy to implement since a standardization for the communication mechanism (interface), e.g. between the SIP layer and the IP layer, is not required for integrated terminals and can easily be implemented, for example, by API.
- Even if the SIP call setup establishment fails and an entry in the CN's binding cache is created due to the route optimization procedure in the IP layer of the MN, the functionality of the UE is not affected negatively.
- The proposed solution can be applied to various network solutions, in particular to the $3^{rd}$ generation networks where SIP is used as multimedia call control protocol and where Mobile. IPv6 is used at the IP level. The invention can be applied to 3GPP2 and 3GPP networks, in particular in a multi-access environment (such as GPRS/UMTS, WLAN, cdma2000) where IMS services are provided. In detail, the proposed solution is applicable for a IMS capable user equipment and to a network adopting an IP based protocol such as Mobile IPv6.

The above and still further objects, features and advantages of the invention will become more apparent upon referring to the description and the accompanying drawings.

BRIEF DESCRIPTION OF THE DRAWINGS

FIG. 2 comprising FIGS. 2A, 2B and 2C shows a signalling diagram of a known SIP call establishment according to 3GPP.

FIG. 3 comprising FIGS. 3A, 3B and 3C shows a signalling diagram of a known SIP call establishment according to 3GPP added by a known Mobile IPv6 user plane routing optimization.

FIG. 4 comprising FIGS. 4A, 4B and 4C shows a signalling diagram of an embodiment of a SIP call establishment with Mobile IPv6 user plane routing optimization.

FIG. 5 comprising FIGS. 5A, 5B and 5C shows a signalling diagram of another embodiment of a SIP call establishment with Mobile IPv6 user plane routing optimization.

DETAILED DESCRIPTION OF THE INVENTION

A best mode of carrying out the invention is described in the following.

Figure 1:
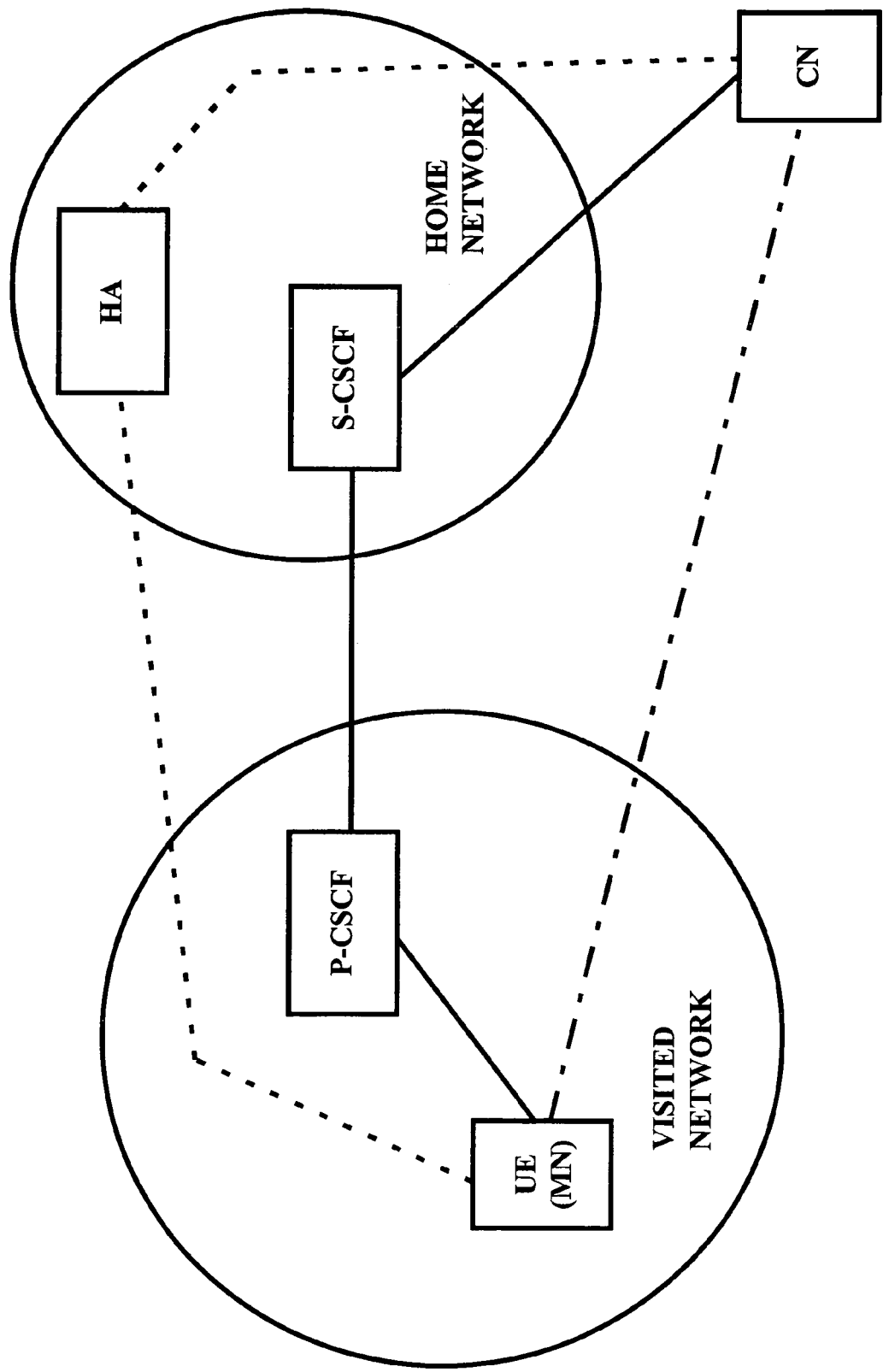
FIG. 1 shows a simplified diagram of a communication network environment in which the present invention is applicable.

In FIG. 1, a simplified diagram of a communication network environment based, for example, on the 3GPP specifications is shown. It is to be noted that other known communication elements and/or entities are involved for a communication connection, for example, UTRAN, GPRS domain elements and the like, which are not described here in further detail for the sake of simplicity. The proposed solution can be applied in a multi-access environment, such as GPRS/UMTS, where IMS services are provided, in particular where SIP (application level) is used as multimedia call control protocol and where Mobile IPv6 is used at the IP level (network level) for IP mobility. However, it is to be noted that the proposed solution is also applicable in other network environment where a network layer route optimization procedure and an application layer setup procedure are implemented.

In FIG. 1, in a visited network area, a user equipment UE, also referred to hereinafter as mobile node MN, and a P-CSCF are shown. On the other hand, in a home network area, which is the network to which the MN is originally subscribed, a S-CSCF is located. The home network comprises further a server which is associated with the MN and provides mobility management services or the like, such as a home agent HA used as a location registration element for the MN. Additionally, in FIG. 1, a correspondent node CN is shown with which a communication connection is to be established from the MN. The CN may be located in the home network or in any other network different to the home network. In the latter case, additional call relaying network elements such as gate elements and the like are necessary for the establishment of a connection to the CN. For the proposed solution, the MN and optionally also the CN are capable of performing route optimization for an IP based communication connection, for example based on MIPv6.

The MN as well as the CN may be a terminal apparatus of different type. For example, the MN and/or the CN may be a mobile phone, a mobile laptop computer, a personal digital assistant (PDA) or the like. Nevertheless, a communication partner node may also be a fixed terminal such as a personal computer PC or the like. Irrespective of its specific type (e.g. personal computer, mobile phone, PDA and the like) the mobile node MN (and optionally the CN as well) may comprise several means (not shown) which are required for its communication functionality. Such means are for example a processor unit for executing instructions and processing data for the communication connection (e.g. transmission content and signalling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard, a microphone and headset for communication, and the like), and network interface means for establishing a communication connection under the control of the processor unit (e.g. (wireless or wired) interface means, an antenna, and the like). These means can be integrated within one device (e.g. in case of a mobile telephone) or in several devices forming the user equipment (e.g. in case of a personal computer or laptop).

When the MN intends to establish the connection to the CN, a session initiation procedure by means of the SIP functionality is performed. First, the MN contacts the P-CSCF as the entry point for a connection to the network which is located in the visited network in which the MN is currently located. Then, the P-CSCF contacts the S-CSCF in the home network of the MN which controls the call of the MN. Via the S-CSCF, the CN is contacted so as to establish the connection to the MN. Furthermore, the MN has a connection to the HA (dotted line) for the location registration. When a user plane from the CN to the MN for the data transmission is to be established, this is performed via the HA which maps the HoA and the CoA of the MN with each other. After the route optimization procedure, a direct connection between the MN and the CN for data transmission is possible.

Figures 2, 2B:
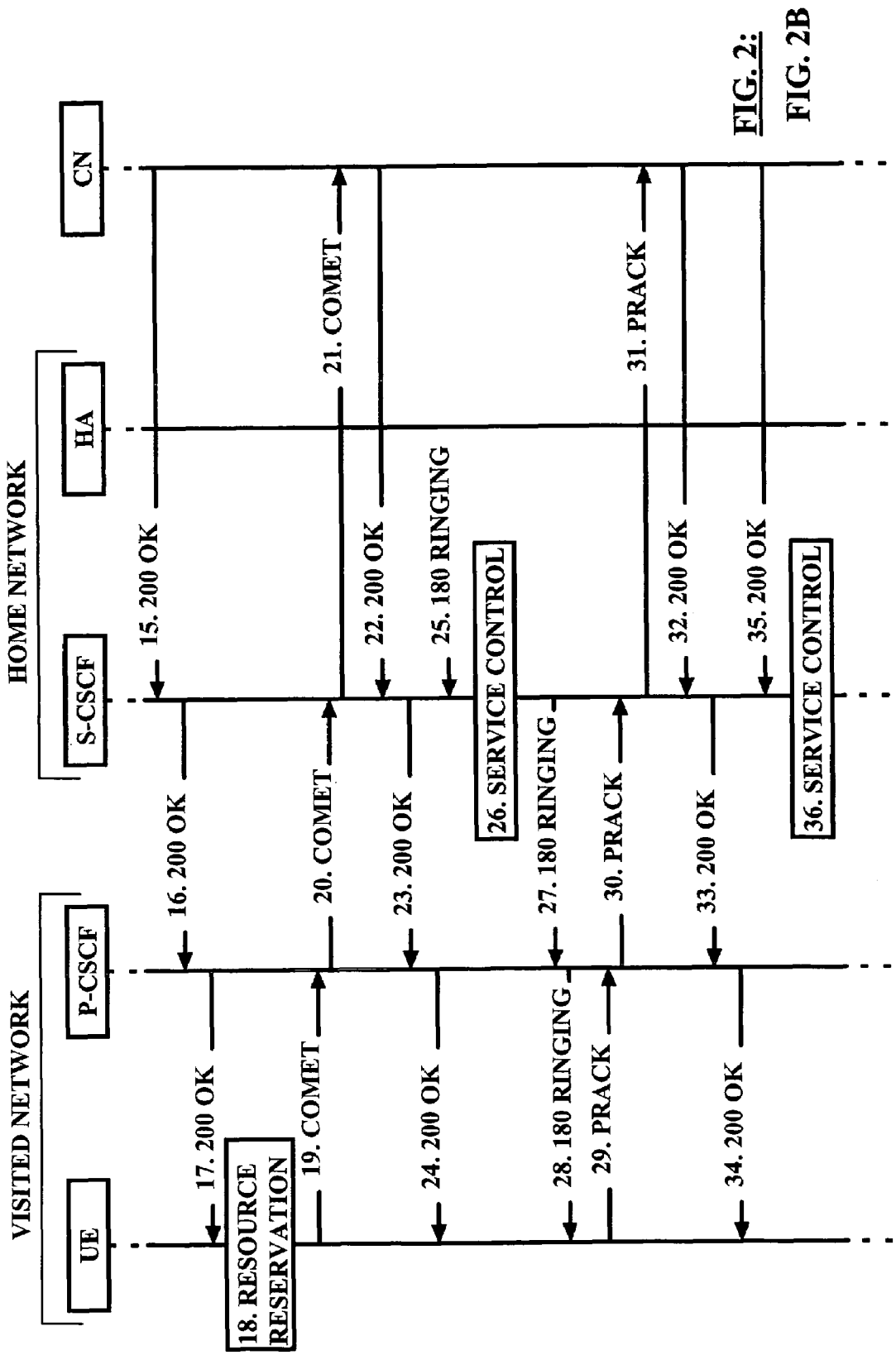
Figures 3, 3A:
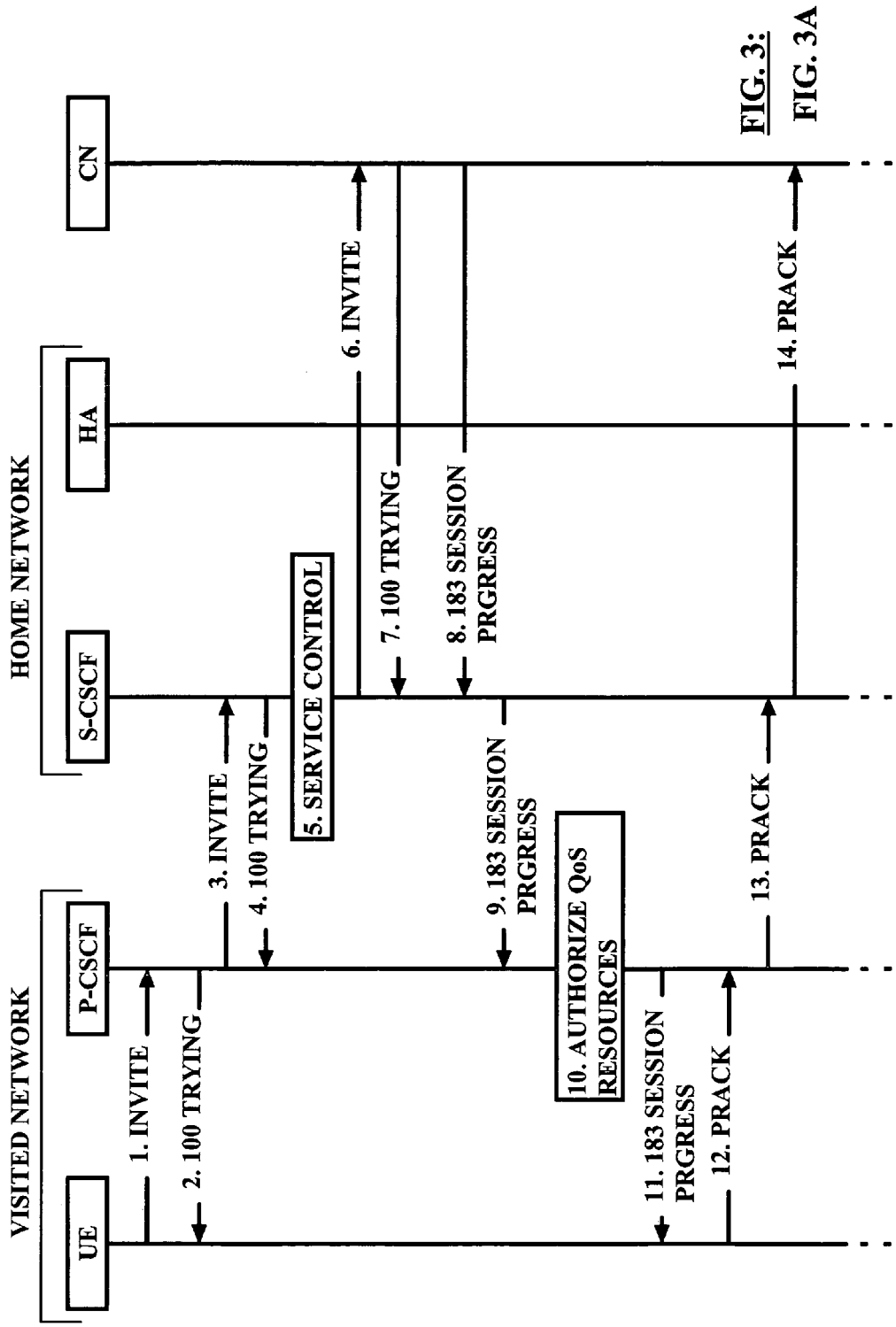
Figures 4, 4A:
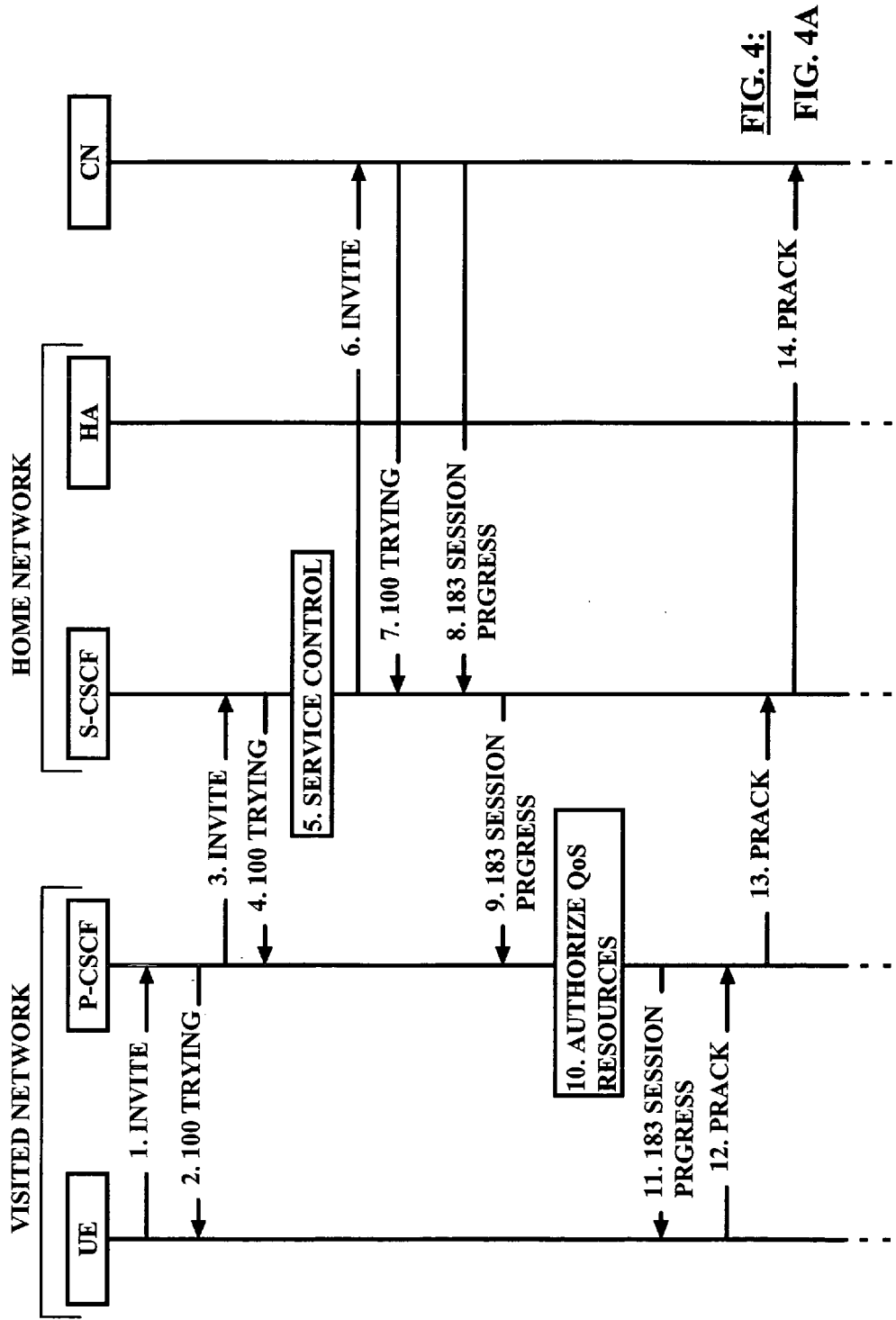
Figures 4, 4B:
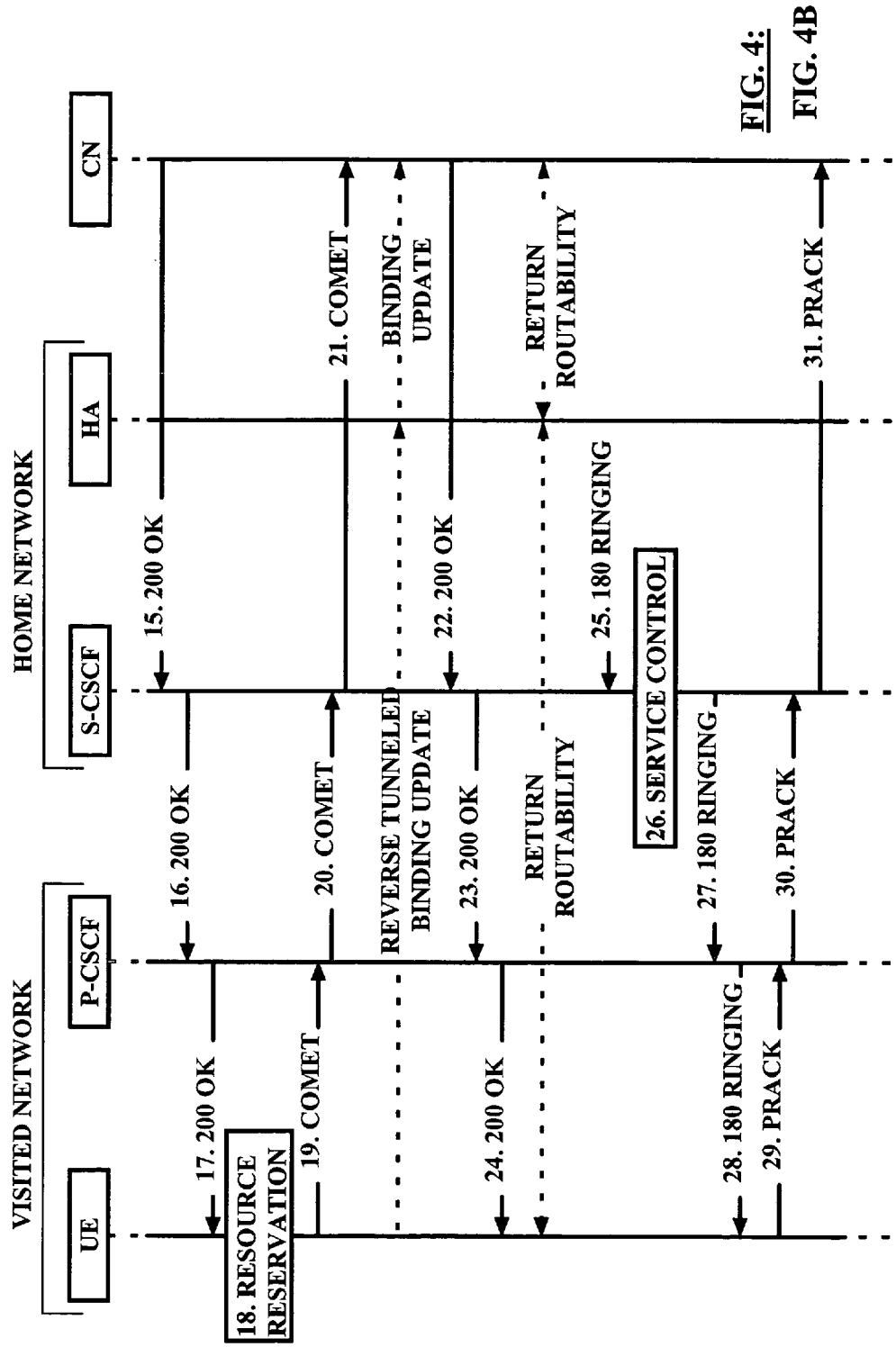

Referring to FIG. 4 consisting of FIGS. 4A, 4B and 4C, the establishment of, for example, a multimedia connection between the MN and the CN according to a preferred embodiment is described. First, a SIP call establishment is to be initialized by the MN via the IM subsystem infrastructure. The underlying SIP call establishment procedure according to the proposed solution is basically the same as the standard 3GPP based SIP call establishment described in connection with FIG. 2. Thus, the same reference numbers for the messages and steps according to FIG. 4 refer to those described in connection with FIG. 2 and a detailed description thereof is omitted in this place.

It is to be noted that FIG. 4 represents merely one example for the SIP call establishment. The exact content of the various SIP signalling messages is not imperative for the present solution. The content may be specification specific and/or application specific and can thus vary in different scenarios. Thus, the signalling flow may be different for various communication scenarios, while the proposed solution can be implemented during an execution of any of such application layer based signalling.

According to FIG. 4, during the SIP call establishment procedure, the SIP layer in the protocol stack of the user equipment is provided with the IP address of the CN in a SDP descriptor. The SIP INVITE message is based on the CN's SIP URI. When the session is started, the MN only knows the SIP address of the CN. The SIP infrastructure (i.e. the IM subsystem) is capable of routing packets correctly to its destination (the CN) on the basis of the SIP URI. When the CN responds with a 200 OK message (messages or steps 15 to 17), the SDP included in this message the IP address of the CN, the port number, the codecs to be used, etc.. Thus, the MN knows the destination IP address, i.e. the IP address of the CN, from the SDP descriptor received during the SIP call establishment from the P-CSCF (message 17) at the SIP layer. In step 18, the MN knows that the QoS setup has been approved, even if the resources are not finally committed (the resource reservation that is initiated is based on the CoA of the MN and the destination IPv6 address of the CN. So resource reservation assumes that the route optimization procedure will complete successfully). Then, the MN initializes a Binding Update procedure for initializing a route optimization to the CN on the IP layer (network layer), related to the IP mobility, during the SIP call establishment on the application layer procedure.

Figure 6:
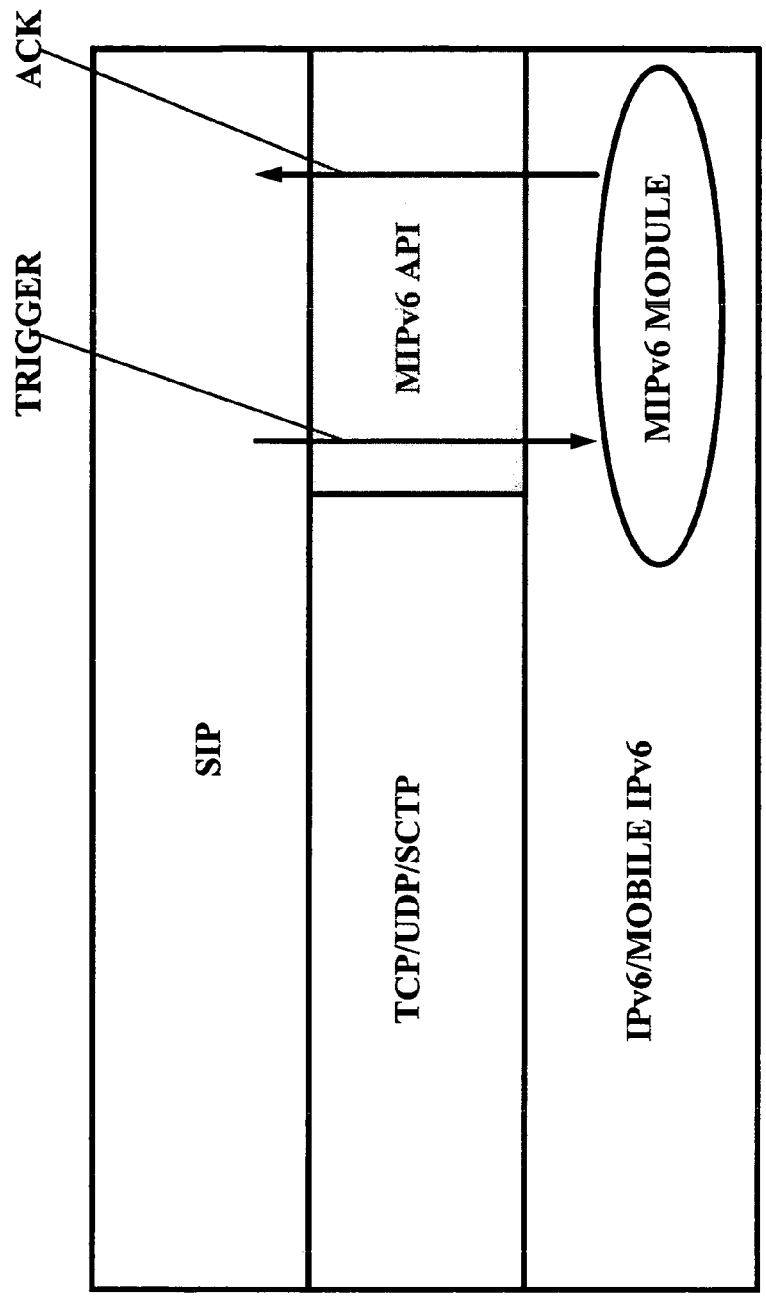
FIG. 6 shows a protocol stack diagram illustrating an interaction of the SIP layer with the MIPv6 layer.

For this purpose, a trigger signal is sent from the SIP layer (application layer) of the protocol stack of the MN to a MIPv6 module at the IP layer (network layer) of the protocol stack of the MN before the SIP signalling for the call setup completion. The reason for this is that only the SIP layer is aware of the IP address of the CN at this stage of the call setup procedure since the MN is setting up the call through the SIP infrastructure. The transmission of the trigger signal is illustrated in FIG. 6. In order to enable the transmission of the trigger, a vertical interface between the SIP layer and the MIPv6 layer in the protocol stack is provided. This interface is implemented, for example, by means of an application programming interface (API) internal to the UE. The trigger signal may be a predefined data stream and includes an instruction to the MIPv6 module to initiate the route optimization procedure to the CN as well as the address of the CN. This address is derived in the SIP layer from the information contained in the SDP descriptor. In other word, the SDP descriptor information are used to trigger the route optimization on the IP layer. After the MIPv6 module has received the trigger signal, an acknowledgment ACK is returned via the interface to the SIP layer. The ACK message is immediately on receiving the trigger signal. The reason for the ACK is to ensure reliability of the trigger transmission. In the case that the MIPv6 module has not received the trigger signal for any reason (i.e. no ACK is transmitted), the SIP layer can resend the trigger. The retransmission may be based on a timer or the like related to the SIP layer, which is canceled when the ACK is received. The control of the generation of the trigger and acknowledgment signals as well as the timing for the transmission thereof may reside in the processing unit of the MN.

With the address information of the CN in the trigger signal, the MIPv6 module starts the route optimization by sending a reverse binding update message tunneled via the HA to the CN. The timing of the binding update is preferably such that a binding for the MN is created in the CN before the media flow starts. In the illustrated example, the binding update is initialized after step 18. However, it is to be noted that the binding update may be sent earlier or later in the SIP signalling sequence.

The CN receives the binding update, processes it in order to derive the MN's CoA, and initializes the return routability test, when this is mandatory, by using the MN's CoA at the IP level. The return routability test is also executed while the SIP call establishment procedure proceeds. In the illustrated example, the return routability test is executed after step 22. However, it is to be noted that the return routability procedure can be omitted if the used transport protocol specification allows this.

Thus, in the proposed solution, the route optimization on the IP layer is performed while the SIP call establishment is performed. The SIP call establishment and the MIPv6 route optimization are performed in parallel. This means that the generic SIP procedure is preferably not involved by the signalling during the MIPv6 route optimization.

With regard to the timing for starting the route optimization procedure during the SIP procedure, it is to be noted that the SIP signalling is independent of MIPv6 route optimization procedure. SIP signaling generally takes a longer time than the MIPv6 route optimization procedure. Hence depending on the time it takes to complete the SIP signaling, the MIPv6 RO can be triggered at the appropriate time in the SIP messaging sequence. In this connection, it is to be noted that SIP signaling for a VoIP (Voice over IP) call setup may take, for example, between 6~20 seconds, while a MIPv6 routing update including the Return Routability test procedure is completed in a significant shorter time period.

Hence, when the multimedia session by SIP setup is established and the media flow via the user plane starts, the route between the MN and the CN in both directions (user plane and reverse user plane) is already optimized. Thus, the signalling flow is improved and latency difficulties of packets are reduced.

Figures 5, 5B:
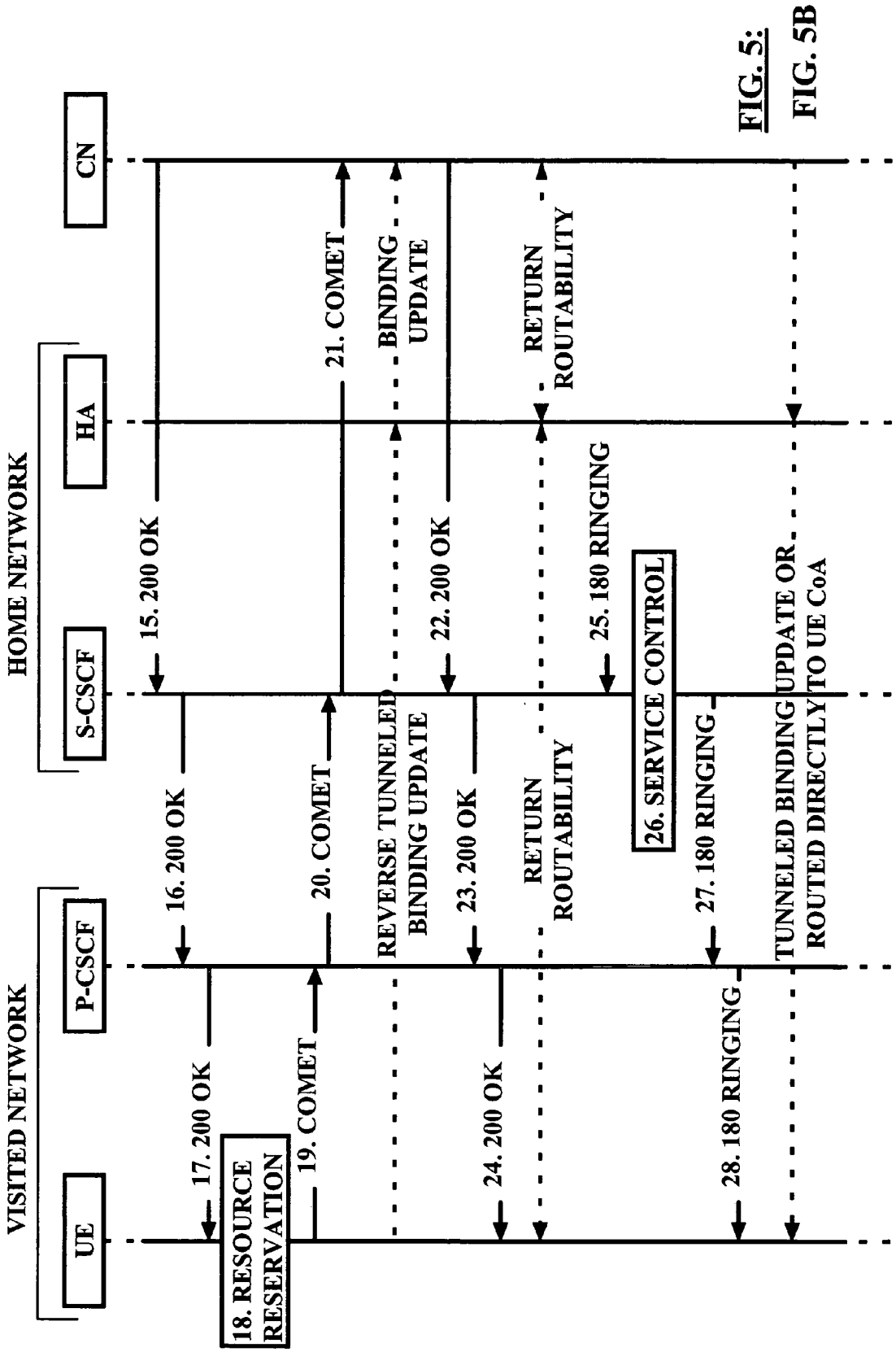

A further example of the proposed solution is described with reference to FIG. 5 consisting of FIGS. 5A, 5B and 5C. In this example, both the MN and the CN are capable of initializing MIPv6 route optimization.

The measures for the SIP signalling and the route optimization on the IP layer at the MN (UE) side are basically the same as those described in FIG. 4 so that a detailed description thereof can be omitted. As the difference to the solution according to FIG. 4, in the present example, the CN is also capable of initializing a route optimization.

After the CN has received the MN's CoA by means of the binding update message, it executes a processing related to the binding update procedure for route optimization. This binding update related processing of the CN can be started at any time after step 22 in the signalling flow according to FIG. 4. If the MN and the CN are both mobile and away from their home networks, both the end-points will perform route optimization messaging, i.e. the exchange of binding update messages following return routability test. However if the CN is stationary or in its home network, for example, after receiving the binding update message (following a successful return routability test) originated from the MN, the CN only adds an entry in its binding cache. This entry in the binding cache is essentially a mapping of the MN's HoA to its CoA. The IPv6 stack ensures that packets are routed to the MN's CoA directly when this entry exists in the binding cache of the CN. In the described example, a CN originated binding update is transmitted after step 28, i.e. after the return routability test in response to the binding update originated from the MN is performed.

Again, the CN originated route optimization procedure, if necessary, i.e. the binding update of the CN to the MN and the return routability test, are performed during the SIP call establishment procedure. Thus, an optimized route for the user plane is present when the media flows starts.

As mentioned above, the interface between the SIP layer and the MIPv6 layer (i.e. the MIPv6 module) can be internal to the UE. Thus, a particular specification for the interface is not required. Only in the case of a so-called split user equipment the interface needs to be standardized. In a split user equipment, the Mobile IPv6 layer may reside in the mobile terminal MT which represents the component communicating with the network and setting up radio connections as requested by the call control, and the SIP applications may reside in the terminal equipment TE which represents the component used to provide services to the end user. Such a construction is typical, for example, for a laptop or PC user equipment.

As described above, a mechanism for optimizing an establishment of a communication connection between a mobile node and a correspondent node in a packet based communication network using, for example, IP is proposed. After starting an application level communication connection setup, for example SIP based, between the mobile node and the correspondent node via a communication subsystem infrastructure, for example the IM subsystem infrastructure, a trigger signal comprising the address of the correspondent node is transmitted from the SIP layer to the IP layer in the mobile node via an interface. In response to the trigger signal, an IP level route optimization procedure is performed while the application level communication connection setup proceeds.

It should be understood that the above description and accompanying figures are merely intended to illustrate the present invention by way of example only. The described embodiments of the present invention may thus vary within the scope of the attached claims.

What is claimed is:

1. A method, comprising:
   starting an application level communication connection setup procedure between a mobile node and a correspondent node via a communication subsystem infrastructure of a packet based communication network by transmitting and receiving application level signaling messages between the correspondent node and the mobile node;
   transmitting, during the application level communication connection setup procedure, a trigger signal from an application layer to a network layer in the mobile node wherein the trigger signal comprises the address of the correspondent node; and performing, in response to the trigger signal, a network level route optimization procedure during the application level communication connection setup procedure.

2. The method according to claim 1, wherein the packet based communication network comprises wireless communication network parts.

3. The method according to claim 1, wherein the network level is based on an internet protocol based transport protocol.

4. The method according to claim 3, wherein the address of the correspondent node is an internet protocol address.

5. The method according to claim 3, wherein the IP based transport protocol uses mobile internet protocol version 6.

6. The method according to claim 5, wherein the communication subsystem infrastructure further includes a home agent.

7. The method according to claim 1, wherein the application level communication connection setup procedure is executed by using the session initiation protocol wherein the address of the correspondent node is provided to the mobile node in a session description protocol descriptor.

8. The method according to claim 1, wherein the network level route optimization procedure comprises a binding update procedure in which the care-of-address of the mobile node is transmitted to the correspondent node.

9. The method according to claim 1, wherein performing the network level route optimization procedure comprises initializing a network level route optimization on the mobile node side.

10. The method according to claim 9, wherein performing the network level route optimization procedure comprises initializing a network level route optimization on the correspondent node side when an network level route optimization signaling from the mobile node is received.

11. The method according to claim 1, wherein performing the network level route optimization procedure is completed before the application level communication connection setup procedure is completed.

12. The method according to claim 1, wherein transmitting the trigger signal is performed via an interface provided between the application layer and a network level module in the network layer of the mobile node.

13. The method according to claim 12, wherein the interface is implemented by an application programming interface.

14. The method according to claim 12, further comprising transmitting an acknowledgment from the network level module to the application layer after the trigger signal comprising the address of the correspondent node is received.

15. An apparatus, comprising:
a connector configured to perform an application level communication connection setup procedure between the network node and a correspondent node via a communication subsystem infrastructure of a packet based communication network and to transmit and receive application level signaling messages between the correspondent node and the network node;
a transmitter configured to produce and transmit, during the application level communication connection setup procedure, a trigger signal from an application layer to a network layer in the network node wherein the trigger signal comprises the address of the correspondent node; and
an optimizer configured to perform, in response to the trigger signal, a network level route optimization procedure during the application level communication connection setup procedure.

16. The apparatus according to claim 15, wherein the packet based communication network comprises wireless communication network parts.

17. The apparatus according to claim 15, wherein the network level is based on an based transport protocol.

18. The apparatus according to claim 17, wherein the address of the correspondent node is an internet protocol address.

19. The apparatus according to claim 17, wherein the internet protocol based transport protocol uses mobile internet protocol version 6.

20. The apparatus according to claim 19, communication subsystem infrastructure further includes a home agent.

21. The apparatus according to claim 15, wherein the apparatus is configured to perform the application level communication connection setup procedure and to use the session initiation protocol wherein the address of the correspondent node is provided in a session description protocol descriptor.

22. The apparatus according to claim 15, wherein the optimizer is configured to perform the network level route optimization procedure and to execute a binding update procedure in which the care-of-address of the mobile node is transmitted to the correspondent node.

23. The apparatus according to claim 15, wherein the optimizer is configured to perform the network level route optimization procedure and to initialize a network level route optimization on the network node side.

24. The apparatus according to claim 15, wherein the optimizer is further configured to complete the network level route optimization procedure before the application level communication connection setup procedure is completed.

25. The apparatus according to claim 15, wherein the apparatus further comprises a transmitter configured to transmit and produce the trigger signal and
an interface, wherein the interface is provided between the application layer and network level module in the network layer of the network node.

26. The apparatus according to claim 25, wherein the interface is implemented by an application programming interface.

27. The apparatus according to claim 25, wherein the apparatus further comprises a transmitter configured to produce and transmit an acknowledgment from the network level module to the application layer after the trigger signal, comprising the address of the correspondent node is received.

28. A apparatus, comprising:
means for performing an application level communication connection setup procedure between the network node and the correspondent node via a communication subsystem infrastructure of the packet based communication network by transmitting and receiving application level signaling messages between the correspondent node and the network node;
means for producing and transmitting, during the application level communication connection setup procedure, a trigger signal from an application layer to a network layer in the network node wherein the trigger signal comprises the address of the correspondent node; and
means for performing, in response to the trigger signal, a network level route optimization procedure during the application level communication connection setup procedure.

29. A computer readable storage medium, the computer readable storage medium being configured to store instructions for a processor to perform a method, the method comprising starting an application level communication connection setup procedure between a mobile node and a correspondent node via a communication subsystem infrastructure of a packet based communication network by transmitting and receiving application level signaling messages between the correspondent node and the mobile node;

transmitting, during the application level communication connection setup procedure, a trigger signal from an application layer to a network layer in the mobile node wherein the trigger signal comprises the address of the correspondent node; and performing, in response to the trigger signal, a network level route optimization procedure during the application level communication connection setup procedure.

30. The computer readable storage medium according to claim 29, wherein the packet based communication network comprises wireless communication network parts.

31. The computer readable storage medium according to claim 29, wherein the network level is based on an internet protocol based transport protocol.

32. The computer readable storage medium according to claim 31, wherein the address of the correspondent node is an internet protocol address.

33. The computer readable storage medium according to claim 31, wherein the Internet protocol based transport protocol uses mobile internet protocol version 6.

34. The computer readable storage medium according to claim 33, wherein the communication subsystem infrastructure further includes a home agent.

35. The computer readable storage medium according to claim 29, wherein the application level communication connection setup procedure is executed by using the session initiation protocol wherein the address of the correspondent node is provided to the mobile node in a session description protocol descriptor.

36. The computer readable storage medium according to claim 29, wherein the network level route optimization procedure comprises a binding update procedure in which the care-of-address of the mobile node is transmitted to the correspondent node.

37. The computer readable storage medium according to claim 29, wherein performing the network level route optimization procedure comprises initializing a network level route optimization on the mobile node side.

38. The computer readable storage medium according to claim 37, wherein performing the network level route optimization procedure comprises initializing a network level route optimization on the correspondent node side when an network level route optimization signaling from the mobile node is received.

39. The computer readable storage medium according to claim 29, wherein performing the network level route optimization procedure is completed before the application level communication connection setup procedure is completed.

40. The computer readable storage medium according to claim 29, wherein transmitting the trigger signal is ,performned via an interface provided between the application layer and a network level module in the network layer of the mobile node.

41. The computer readable storage medium according to claim 40, wherein the interface is implemented by an application programming interface.

42. The computer readable storage medium according to claim 40, the method further comprising:

transmitting an acknowledgment from the network level module to the application layer after the trigger signal comprising the address of the correspondent node is received.

\* \* \* \* \*